(12) United States Patent
Maurer et al.

(10) Patent No.: US 8,681,176 B1
(45) Date of Patent: Mar. 25, 2014

(54) RENDERING A MAP USING STYLE IDENTIFIERS

(75) Inventors: Jennifer Maurer, Seattle, WA (US); Sean Egan, Seattle, WA (US); Brian Cornell, Kenmore, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/244,808

(22) Filed: Sep. 26, 2011

Related U.S. Application Data

(63) Continuation of application No. 13/237,830, filed on Sep. 20, 2011, now abandoned.

(51) Int. Cl.
| | |
|---|---|
| G09G 5/00 | (2006.01) |
| G09G 5/02 | (2006.01) |
| G08G 1/123 | (2006.01) |
| G06F 3/00 | (2006.01) |
| G06F 3/048 | (2013.01) |
| G06K 9/36 | (2006.01) |
| G06K 9/60 | (2006.01) |
| G06F 15/16 | (2006.01) |

(52) U.S. Cl.
USPC ........... 345/619; 345/581; 345/582; 345/589; 345/660; 340/995.1; 340/995.14; 715/744; 715/764; 715/765; 382/276; 382/282; 382/305; 709/203; 701/409; 701/425; 701/429; 701/430; 701/454; 701/456; 701/457; 701/461; 701/522

(58) Field of Classification Search
USPC ......... 345/619, 629, 660, 661, 672, 676, 470, 345/471, 581, 582, 587, 589, 593, 634, 636, 345/642, 666–671; 340/995.1, 340/995.11–995.19, 995.2, 995.21–995.28; 715/744, 747, 748, 764, 765, 781, 788, 715/800, 801, 864; 382/276, 282, 298, 305; 709/201, 203, 217, 219; 701/409, 414, 701/423, 425, 428–430, 450–457, 461, 522, 701/532, 537, 540
See application file for complete search history.

(56) References Cited

U.S. PATENT DOCUMENTS

| | | |
|---|---|---|
| 5,519,809 A | 5/1996 | Husseiny et al. |
| 5,864,632 A | 1/1999 | Ogawa et al. |

(Continued)

OTHER PUBLICATIONS

Bing Maps AJAX Control, Version 7.0 (2011).

(Continued)

*Primary Examiner* — Wesner Sajous
*Assistant Examiner* — Andrew Shin
(74) *Attorney, Agent, or Firm* — Marshall, Gerstein & Borun LLP

(57) ABSTRACT

A map server generates vector descriptors and corresponding style identifiers for rendering a map image. Each vector descriptor indicates a geometry of a respective map element in accordance with a vector graphics format, and each style identifier identifies a style according to which the corresponding map element is rendered. The map server then causes map data including the vector descriptors and the style identifiers to be transmitted to the client device via a communication network. When the map server receives a request for style data for modifying a map image at the client device, the map server generates a description of visual characteristics for one or more styles identified by the style identifiers included in the map data previously provided to the client device and causes the description of visual characteristics to be transmitted to the client device for applying to the vector descriptors at the client device.

21 Claims, 9 Drawing Sheets

(56) References Cited

U.S. PATENT DOCUMENTS

| | | | |
|---|---|---|---|
| 5,966,135 A | 10/1999 | Roy et al. | |
| 6,314,370 B1 | 11/2001 | Curtright | |
| 6,388,684 B1 | 5/2002 | Iwamura et al. | |
| 6,577,714 B1 | 6/2003 | Darcie et al. | |
| 7,142,217 B2 | 11/2006 | Howard et al. | |
| 7,308,117 B2 | 12/2007 | Chitradon et al. | |
| 7,734,412 B2 | 6/2010 | Shi et al. | |
| 7,844,417 B2 | 11/2010 | Du | |
| 7,865,301 B2 | 1/2011 | Rasmussen et al. | |
| 7,933,897 B2 | 4/2011 | Jones et al. | |
| 7,945,546 B2 | 5/2011 | Bliss et al. | |
| 8,010,407 B1 | 8/2011 | Santoro et al. | |
| 8,014,946 B2 | 9/2011 | Rasmussen et al. | |
| 8,041,506 B2 | 10/2011 | Bliss et al. | |
| 2002/0113797 A1 | 8/2002 | Potter et al. | |
| 2003/0229441 A1* | 12/2003 | Pechatnikov et al. | 701/201 |
| 2004/0217980 A1 | 11/2004 | Radburn et al. | |
| 2005/0285876 A1 | 12/2005 | Balaga et al. | |
| 2006/0074660 A1 | 4/2006 | Waters et al. | |
| 2006/0139375 A1 | 6/2006 | Rasmussen et al. | |
| 2006/0170693 A1 | 8/2006 | Bethune et al. | |
| 2006/0271281 A1 | 11/2006 | Ahn et al. | |
| 2006/0293847 A1 | 12/2006 | Marriott et al. | |
| 2007/0016651 A1 | 1/2007 | Blagsvedt et al. | |
| 2007/0021908 A1 | 1/2007 | Jaugilas et al. | |
| 2007/0050340 A1 | 3/2007 | von Kaenel et al. | |
| 2007/0098211 A1* | 5/2007 | Walton et al. | 382/100 |
| 2007/0118520 A1 | 5/2007 | Bliss et al. | |
| 2007/0176796 A1 | 8/2007 | Bliss et al. | |
| 2007/0208498 A1* | 9/2007 | Barker et al. | 701/117 |
| 2007/0226314 A1 | 9/2007 | Eick et al. | |
| 2007/0245238 A1 | 10/2007 | Fugitt et al. | |
| 2008/0016472 A1 | 1/2008 | Rohlf et al. | |
| 2008/0109159 A1 | 5/2008 | Shi et al. | |
| 2008/0238941 A1 | 10/2008 | Kinnan et al. | |
| 2009/0089149 A1 | 4/2009 | Lerner et al. | |
| 2009/0113296 A1* | 4/2009 | Lacy et al. | 715/700 |
| 2009/0198767 A1 | 8/2009 | Jakobson et al. | |
| 2009/0271718 A1 | 10/2009 | Balaishis et al. | |
| 2010/0073391 A1 | 3/2010 | Horowitz et al. | |
| 2010/0114941 A1 | 5/2010 | Von Kaenel et al. | |
| 2010/0118025 A1* | 5/2010 | Smith et al. | 345/418 |
| 2010/0194784 A1 | 8/2010 | Hoff et al. | |
| 2010/0201707 A1 | 8/2010 | Rasmussen et al. | |
| 2010/0321399 A1 | 12/2010 | Ellren et al. | |
| 2011/0004830 A1 | 1/2011 | Von Kaenel et al. | |
| 2011/0153186 A1 | 6/2011 | Jakobson | |
| 2011/0172909 A1 | 7/2011 | Kahn et al. | |
| 2011/0177845 A1* | 7/2011 | Fasold | 455/566 |
| 2011/0191014 A1 | 8/2011 | Feng et al. | |
| 2011/0208724 A1 | 8/2011 | Jones et al. | |
| 2011/0267369 A1 | 11/2011 | Olsen | |
| 2011/0306304 A1 | 12/2011 | Forutanpour et al. | |

OTHER PUBLICATIONS

Bing Services, "Getting Started with V4 of the API (Part 1)," Microsoft (2011). Retrieved from the Internet on Sep. 26, 2011: URL:http://msdn.microsoft.com/en-us/library/aa907678.aspx.

Neoseeker, "Bing Maps Combines Raster Tiles and Vector Graphics for Enhanced Experience," Neo Era Media Inc. (1999-2011). Retrieved from the Internet on Sep. 26, 2011: URL:http://www.neoseeker.com/news/14507-bing-maps-combines-raster-tiles-and-vector-graphics-for-enhanced-experience.

Sample et al., "Tile-Based Geospatial Information System: Principles and Practices," pp. xi-xiv, 193-203 (Springer 2010).

* cited by examiner

RENDERING A MAP USING STYLE IDENTIFIERS

CROSS-REFERENCE TO RELATED APPLICATION

This application is a continuation of and claims priority to U.S. application Ser. No. 13/237,830, filed Sep. 20, 2011, entitled "Rendering a Map Using Style Identifiers," the entire disclosure of which is hereby expressly incorporated by reference herein.

FIELD OF THE DISCLOSURE

The present disclosure relates to map rendering systems, such as electronic map display systems, and more specifically to a map rendering system that renders map elements using style data separated from content data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, maps of geographic regions may be displayed by software applications running on a wide variety of devices, including mobile phones, car navigation systems, hand-held Global Positioning System (GPS) units, and computers. Depending on the application and/or user preferences, maps may display topographical data, street data, urban transit information, traffic data, etc. Further, some applications display maps in an interactive mode, so that a user may operate various controls (radio buttons, scrollbars, etc.) to change the zoom level or pan the "camera" to a new location, for example. A user in some cases also may select or unselect the display of certain information. For example, the user may operate the appropriate control to turn on the display of bicycle trails.

To render a map image, a device typically receives raster images from a dedicated server. For example, a map server may operate on the Internet and provide images in a Portable Network Graphics (PNG) format to various client devices for the specified geographic regions. While raster images are relatively easy to render at a client device, raster image data typically requires a large amount of storage space for a comprehensive map. Also, it is difficult to efficiently manipulate raster images at a client device. For example, to zoom in on a selected region, either new raster image data is retrieved from the server, or the available raster image data is enlarged with a noticeable loss in quality.

SUMMARY

In an embodiment, a method for providing data to a client device for rendering a map image at the client device is implemented in a map server. The client device is coupled to the map server via a communication network. The method includes generating vector descriptors that indicate geometry of map elements in accordance with a vector graphics format, generating, for each vector descriptor, a respective style identifier that identifies a style according to which the corresponding map element is rendered, and causing map data that includes the vector descriptors and the style identifiers to be transmitted to the client device. The method also includes receiving, from the client device, a request for style data for modifying a map image to which the map data corresponds, generating a description of visual characteristics for one or more styles identified by the style identifiers included in the map data in response to receiving the request for the style data, and causing the description of visual characteristics to be transmitted to the client device for applying to the plurality of vector descriptors at the client device.

In another embodiment, instructions stored on a tangible non-transitory computer-readable medium are executed on a processor of a client device to cause the processor to receive, from a user interface, a request to generate a map image for a selected geographic region corresponding to a selected map type. The instructions further cause the processor to generate a request for map data corresponding to the selected geographic region and the selected map type, such that the request includes (i) an indication of the selected map type and (ii) style identifiers that identify respective styles for use in rendering the map data. The instructions also cause the request for the map to be transmitted to a map server via a communication network and receive the map data in a vector graphics format from the map server. In particular, to receive the map data, the instructions cause the processor to receive vector descriptors that describe respective map elements associated with the selected geographic region and receive a description of visual characteristics for the styles identified in the request for map data. Further, the instructions cause the processor to generate the map image using the received plurality of vector descriptors, including use the received description of visual characteristics to render the plurality of vector descriptors.

In yet another embodiment, a method for providing data to a client device for rendering a map image is implemented in a map server that is coupled to the client device via a communication network. The method includes providing vector descriptors to the client device, where each of the plurality of vector descriptors describes a respective map element in accordance with a vector graphics format. Further, the method includes receiving, from the client device, a request for style data corresponding to several styles to be applied to the plurality of vector descriptors at the client device, including receiving a respective style identifier for each of the plurality of styles, determining which of the styles identified by the style identifiers share visual characteristics, and providing the style data to the client device. In particular, providing the style data includes providing a single instance of a description of visual characteristics shared by two or more styles and providing an indication that the two or more styles share the visual characteristics.

In another embodiment, a method in a map server for providing data to a client device, where the client device uses the data to render a map image, includes receiving, from the client device, a request for map data corresponding to a selected geographic region. The method also includes generating a description of map content in a vector graphics format and generating an indication of a plurality of styles to be applied to the map content when rendering the map image, such that each of the plurality of styles is associated with a respective set of visual characteristics. The method further includes providing the description of map content and the indication of the plurality of styles to the client device in response to the request for map data without providing a description of the visual characteristics of the plurality of styles. Still further, the method includes providing the description of the visual characteristics of the plurality of styles to the client device in response to receiving a request for style data.

DETAILED DESCRIPTION

Figure 1:
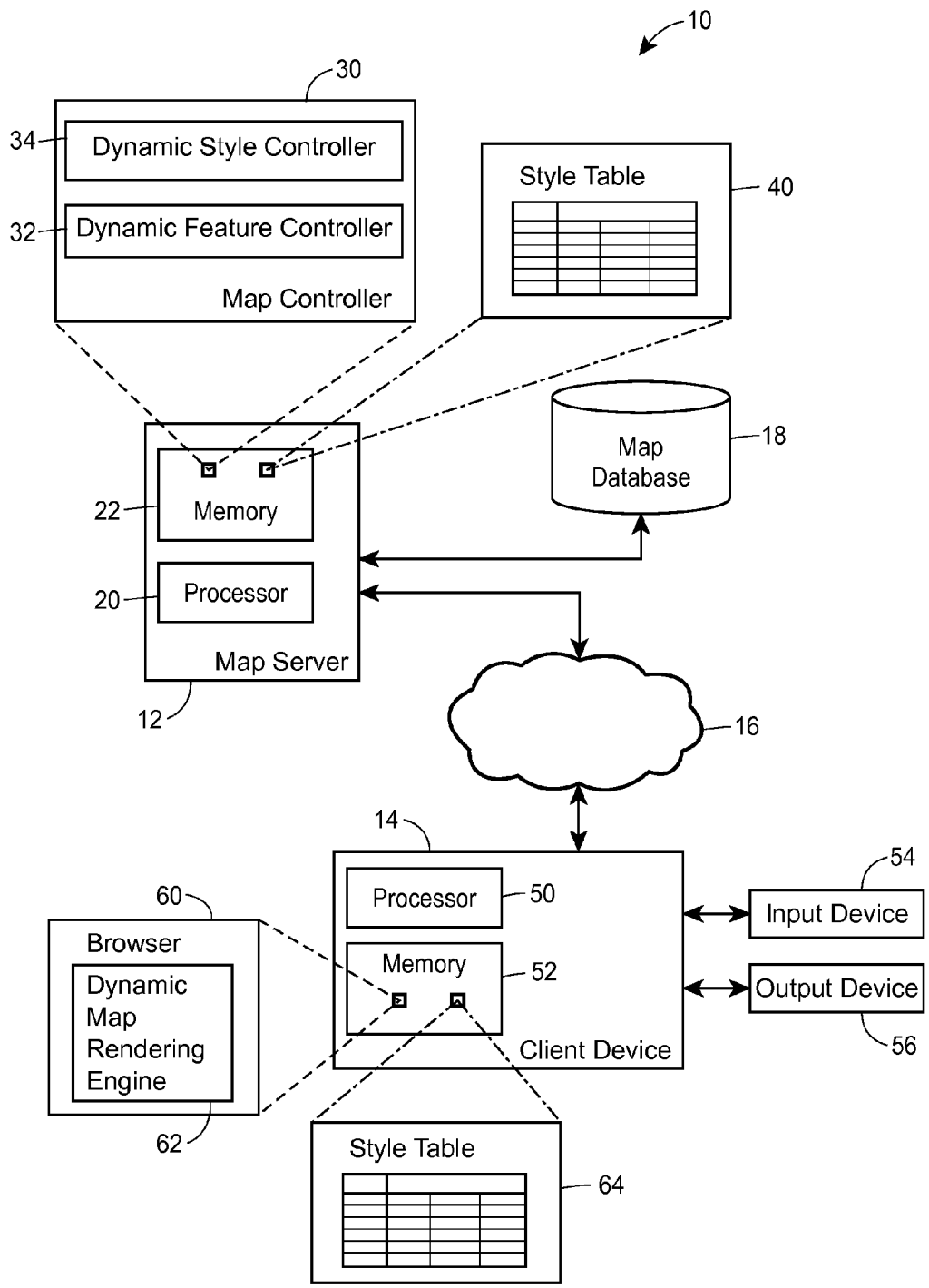
FIG. 1 is a block diagram of a system in which a server provides map content separately from style data to a client device for rendering a map image at the client device, according to an embodiment.

Embodiments of systems and methods for efficiently transferring map data from a map server to a client device are discussed below. To render a map image in a web browser or another application, the client device may request map data from the map server via a communication network, and the map server in response may provide vector data and, in some cases, text data that describes map content as well as style data that indicates how the vector data and the text data should be rendered. More particularly, vector data may specify various geometric shapes (e.g., using mathematical descriptions) and indicate how these shapes should be positioned for rendering various map elements such as roads, buildings, parks, bodies of water, etc., while style data may describe such visual characteristics or properties as line thickness (e.g., width in pixels), line color, one or more fill colors, etc. for various visual styles that may be applied to the vector data. Text data may specify map labels to be displayed for individual or aggregate map elements, for example, and style data may be applied to the text data to render the text using a particular size, color, font, etc. The map server also may specify which visual styles the client device should apply to various vector-based descriptions of map elements (also referred to herein as vector descriptors or simply vectors).

In some embodiments, the map server indicates which visual style applies to a vector-based description of a map element for a particular map type, such as terrain, transit, traffic, bicycle trail, etc. To this end, several styles, each identified by a respective unique style identifier, may be defined. Each style may correspond to one or several visual styles for rendering map elements and/or labels according to different map types. For example, a style with style identifier $S_1$ may correspond to visual style $VS_1$ for rendering a map element as a part of a basic map, visual style $VS_2$ for rendering the same map element as a part of a terrain map, and visual style $VS_3$ for rendering the same map element as a part of a traffic map or a transit map. As another example, a style with style identifier $S_2$ may correspond to visual style $VS_1$ for all map types. The map server may assign style identifiers to vector descriptors when providing map data to the client. In this manner, the map server may provide a certain vector descriptor to the client device only once, and the client may simply re-style the corresponding vector data and/or text data when necessary, e.g., when a user of the client device changes the map type for a certain region. Moreover, the map server in some embodiments may recognize that certain styles correspond to same visual styles for a certain map type. As discussed in more detail below, to reduce the amount of data transmitted via the communication network, the map server may provide shared visual characteristics for several styles and indicate which styles share the visual characteristics for one or several map types.

Referring to FIG. 1, techniques for efficiently transferring map data may be implemented in a system 10. In an embodiment, the system 10 includes a map server 12, a client device 14 communicatively coupled to the map server 12 via a network 16, and a map database 18 communicatively coupled to the map server 12. The network 16 may be a wide area network (WAN) such as the Internet, a local area network (LAN), or any other suitable type of a network. Depending on the embodiment, the map database 18 is coupled to the map server 12 via the network 16 or via another communication link as illustrated in FIG. 1. For simplicity, only one instance of the map server 12, the client device 14, and the map database 18 is illustrated in FIG. 1. However, in other embodiments, the system 10 may include more than one map server 12, more than one client device 14, and/or more than one map database 18.

The map server 12 may include a processor 20 and a computer-readable memory 22 that stores a map controller 30 in the form of computer instructions, for example, that may be executable on the processor 20 directly (e.g., as compiled code) or indirectly (e.g., as a script interpreted by another application executing on the processor 20). The computer-readable memory 22 may include volatile memory to store computer instructions and data on which the computer instructions operate at runtime (e.g., Random Access Memory or RAM) and, in an embodiment, persistent memory such as a hard disk, for example. In an embodiment, the map controller 30 includes a dynamic feature controller 32 that generates vector data for various map elements that are provided as map content to the client device 14. As used herein, a map feature (or simply feature) may correspond to an individual map element such as a building or an aggregation of several map elements such as several buildings, a park, and several pedestrian paths of a college campus. In general, a map feature may be described using one or more vector descriptors.

In addition to vector data, the dynamic feature controller 32 may generate text data such as descriptions of map labels in the American Standard Code for Information Interchange (ASCII) format, a Unicode format, or any other suitable alphanumeric or character format. A map label may be displayed next to or on top of an individual map element such as a building, a park, or a street segment, or an aggregation of several map elements such as a village, a city, or a city neighborhood. In general, a map label may be displayed using characters of a particular color, font, size, etc. Similar to properties of map elements, these and similar properties of a label may correspond to a particular style.

The map controller 30 also includes a dynamic style controller 34 to provide style data to the client 14. According to various scenarios discussed below, the dynamic style controller 34 may provide style data along with vector and text data provided by the dynamic feature controller 32 in response to various events: receiving a request for map data including map content and style data from the client device 14, receiving a request for specified styles from the client device 14, detecting that a different map type has been selected at the client device 14, etc. The dynamic style controller 34 may utilize and, in some embodiments, manage a style table 40 that indicates visual characteristics for various styles. An example implementation of a style table that may be used as the style table 40 is discussed in more detail with reference to FIG. 2. In an embodiment, the dynamic style controller 34 uses the style table 40 to determine which of the styles to be applied to vector and/or text data at the client device 14 share visual characteristics (or a visual style) for one or more types of map data and generates an appropriate indication for the client device 14.

With continued reference to FIG. 1, the client device 14 may include a processor 50 to execute instructions and a memory 52 to store instructions and data. The client device 14 also may include an input device 54 and an output device 56 to receive input from a user and provide output to the user, respectively. The input device 54 may include one or more of a keyboard, a mouse, and a touchscreen, and the output device 56 may include a touchscreen or another type of a monitor, for example. The client device 14 may include various software components, such as device drivers, operating system (OS) event handlers, etc. to control the input device 54 and the output device 56 so as to implement an interactive user interface. Further, software applications executing on the processor 50 may utilize these software components to provide an application-specific user interface.

In an embodiment, the client device 14 is a so-called thin client that depends on another computing device for certain computing and/or storage functions. For example, in one such embodiment, the memory 52 includes only volatile memory such as RAM, and a program and/or storage unit having persistent memory is external to the client device 14. In another embodiment, the memory 52 includes both volatile and persistent memory components.

A browser application 60 may include a set of computer-readable instructions that execute on the processor 50. In general, the browser application 60 accesses web pages that include content such as text, images, embedded video, etc. and instructions in a mark-up language such as Hypertext Markup Language (HTML), and renders the content on the output device 56 according to the instructions in the mark-up language. To this end, the browser application 60 may implement functions for generating and processing data packets that conform to the Hypertext Transfer Protocol (HTTP), parse HTML content, encode data according to the Secure Socket Layer (SSL) protocol, request and verify digital certificates, etc., as well as user interface functions for receiving various user commands related to navigation, rendering, and managing web page data. In some embodiments, the browser application 60 is configured to interpret instructions in a scripting language (e.g., Javascript) provided in a web page.

A dynamic map rendering engine 62 may execute as a component of the browser application 60. Depending on the embodiment, the dynamic map rendering engine 62 may be a plugin (e.g., a set of compiled instructions that extends the functionality of the browser application 60 and executes on the processor 50), a script (e.g., a set of instructions in a scripting language interpreted by the browser application 60 at runtime), or another suitable software component. According to one example scenario, the dynamic map rendering engine 62 is downloaded when a user operating the client device 14 visits a web page that includes an embedded interactive map. More specifically, the web page may include a first hyperlink to an online map server and a certain geographic location as well as a second hyperlink to a copy of the browser application 60, which is required for rendering map data received from the online map server according to the first hyperlink.

During operation, the dynamic map rendering engine 62 may receive vector data, text data, and style data from the map server 12, generate corresponding map images using the received vector data and the style data, and cause the map image to be displayed within a certain region allocated by the browser application 60. For example, the browser application 60 may create an HTML5 Canvas element for displaying map images. The dynamic map rendering engine 62 may also store available style data in a style table 64, which is disposed in the memory 52.

In at least some of embodiments, the dynamic map rendering engine 62 receives vector data that specifies geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The dynamic map rendering engine 62 then may apply style data as appropriate to the specified line segment, so that the line segment is displayed with a particular color, width, etc. As another example, the vector data may specify the contour of a triangle, and the corresponding style data may specify the color of the contour lines, the width of the contour lines, and the color of the interior region of the triangle. In other words, rather than receiving raster images from the map server 12, the dynamic map rendering engine 62 may receive instructions for drawing a map image on the output device 56 and execute the instructions so as to generate a raster map image. In some cases, however, vector data also may include raster images as certain component elements that cannot be easily represented in a vector format.

For simplicity, the client device 14 is illustrated with a single processor 50. However, the client device 14 in other embodiments may include additional processing units (not shown) such as a graphics processing unit (GPU) configured to facilitate image rendering on the output device 56, for example. Further, in an embodiment, the browser application 60 may utilize a library of graphics functions for efficiently generating a map image. For example, the browser application 60 may utilize a software library that supports 3D graphics, such as WebGL, for example. As another example, the memory 52 may store a plugin, such as an OpenGL® or Direct3D® library, having functions for rendering graphics which various applications executing on the client 14, including the browser application 60, may access via an application programming interface (API). Also, in some embodiments, the memory 52 stores additional software components that facilitate efficient rendering of images via the output device 56. For example, the memory 52 may store an Adobe® Flash® plugin or an O3D plugin.

Figure 2:
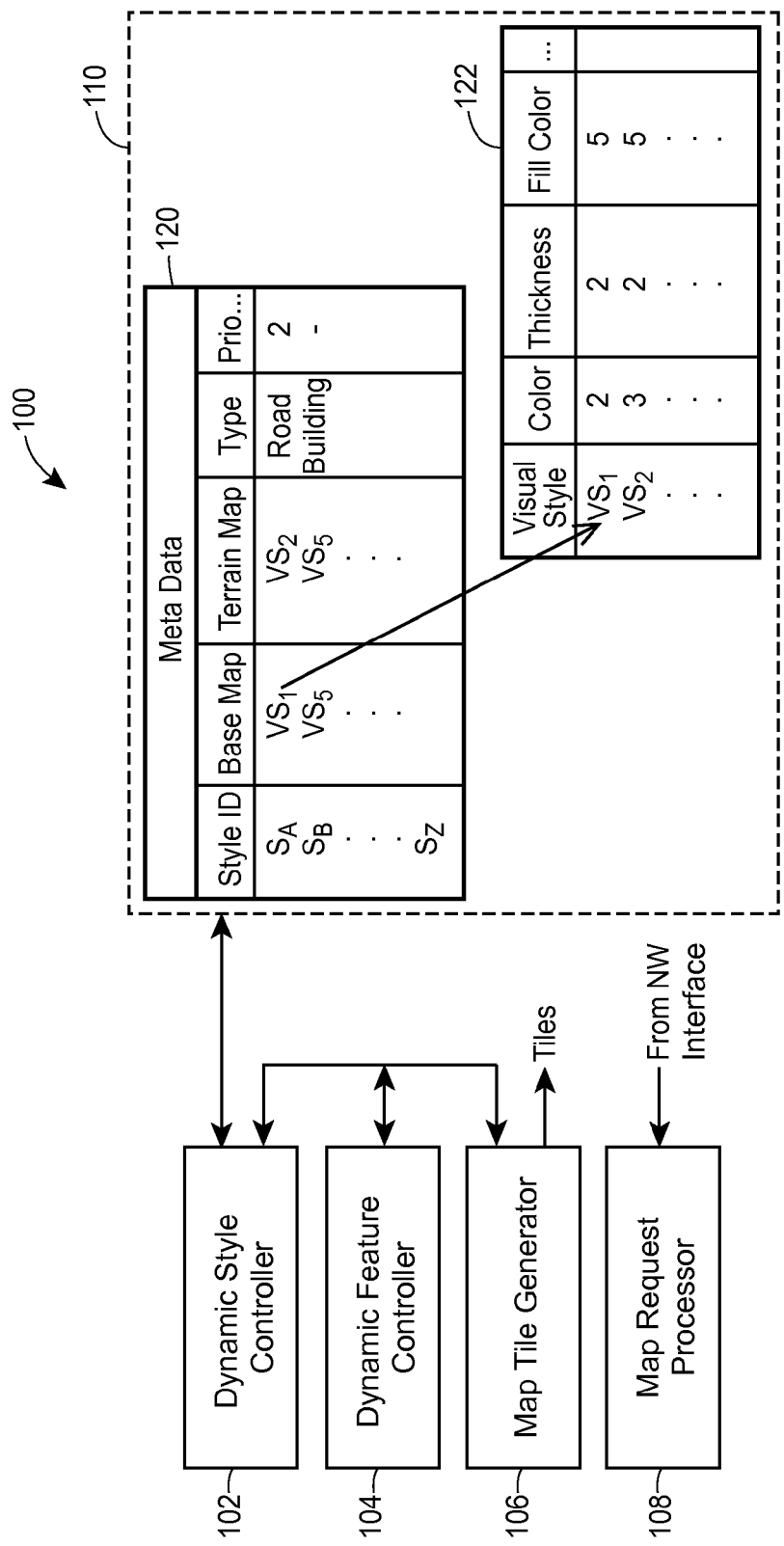
FIG. 2 is a block diagram of an example map controller implemented in the server that may operate in the system of FIG. 1.

Now referring to FIG. 2, a map controller 100 may operate in the map server 12 of FIG. 1, for example. According to an embodiment, the map controller 100 is implemented as a set of instructions that are stored on a computer-readable medium and executable on one or more processors. For example, referring back to FIG. 1, the map controller 100 may be stored in the memory unit 22 and execute on the processor 20.

According to an embodiment, the map controller 100 includes a dynamic style controller 102, a dynamic feature controller 104, a map tile generator 106, and a map request processor 108. Generally speaking, the components 102, 104, 106, and 108 may be distributed among one or several servers in any suitable manner. For example, the dynamic style controller 102 and the dynamic feature controller 104 may operate in a first server, while the map tile generator 106 and the map request processor 108 may operate in a second server coupled to the first server via a network connection.

The map request processor 108 may be configured to process requests from client devices, such as the client device 14, for map data corresponding to a specified geographic regions. Each request may correspond to a single electronic message or a series of electronic messages, depending on the scenario and/or embodiment. For example, the map request processor 108 may receive a request for map data corresponding to a two-mile-wide region centered at latitude 41° 52' 43" and longitude −87° 38' 11". The request may also indicate a zoom level for which map data is being requested. In general, zoom level may correspond to the apparent distance to a map image or a portion of the map image (e.g., as a result of changing the elevation of the viewpoint). In an embodiment, the map request processor 108 is configured to process requests that indicate a zoom level within a certain predefined range, with a lower zoom level corresponding to a larger distance or elevation. Still further, the request may indicate that map data is being requested for rendering a transit map. The request in this case may include a map type indication field set to the appropriate value. Further, as discussed in more detail with reference to FIGS. 3-5, the map request processor 108 may receive a request for style data as well as map data. Depending on the scenario, the map request processor 108 may receive a request for map data and a request for style data in a single electronic message, e.g., a single HTTP message, or separately in respective electronic messages.

After the map request processor 108 receives a request for map data and/or style data from a client device, the map controller 100 provides appropriate data to the client device via one or more electronic messages. In an embodiment, the map tile generator 106 generates map data as a set of map tile descriptors, such that each map tile descriptor describes a map tile, i.e., a portion of a map image of a certain size (e.g., 256 by 256 pixels). The size of a geographic region represented by an individual map tile depends on the zoom level with which the map tile is associated, so that a single map tile at a lower zoom level illustrates a larger geographic area than a single map tile at a higher zoom level. The map tile generator 106 may generate each map tile descriptor according to a vector graphics format, and a client device, such as the client device 14 of FIG. 1, may locally generate a raster image for each tile. In an embodiment, the map tile generator 106 retrieves the requested data from a map database such as the map database 18 illustrated in FIG. 1, for example.

When providing map data to a client device, the map controller 100 may separate map content from style data. The map content in general can include vector data only, vector data along with text data, and, according to some scenarios, text data only. In some cases, the map controller 100 may provide vector data and/or text data that describes map content without providing the corresponding style data to the client device at the same time (if, for example, the client device already has the necessary style data) or, conversely, may provide style data without providing the vector data and/or the text data for map content to which the style data applies (for re-rendering the available map content using updated style data, for example). Further, in some scenarios, the map controller 100 provides vector data, text data, and style data at the same time (e.g., in a same electronic message or a series of electronic messages), with each of the vector data, text data, and the style data selected in view of the vector data, text data, and the style data already available at the client device.

More particularly, the dynamic feature controller 104 may be communicatively coupled to the map tile generator 106 and configured to determine which map elements are associated with the requested map data and generate vector-based descriptions of these map elements. For example, the dynamic feature controller 104 may determine that, in response to a request for map data corresponding to zoom level $Z_i$ for a certain geographic region, vector descriptors corresponding to interstate highways, large bodies of water, etc. must be generated, whereas in response to another request for map data corresponding to zoom level $Z_j$ for the same geographic region, additional vector descriptors corresponding to local roads and buildings must be generated. The dynamic feature controller 104 in some cases also may determine that additional labels must be generated. Further, in some cases, the dynamic feature controller 104 generates different sets of vector descriptors for different map types. For example, a terrain map may include map elements that are not included in a basic map for the same geographic region and zoom level.

The dynamic style controller 102 also may be coupled to the map tile generator 106 and configured to determine what style data, if any, should be transmitted to a client device in response to a request for map data. In some scenarios, a request for map data indicates the map type (terrain, traffic, etc.) according to which a map image is to be generated as well as the styles for which style data is already available for the indicated map type. If, for example, a request for map data indicates that the client device already stores style data for transit maps for styles $S_1$, $S_2$, and $S_3$, and the dynamic style controller 102 determines that the client device requires styles $S_4$ and $S_5$ to render a transit map for the region identified in the request for map data, the dynamic style controller 102 may provide only the necessary style data for styles $S_4$ and $S_5$. In another embodiment, the request for map data explicitly identifies the styles $S_4$ and $S_5$ to request that appropriate style data be provided to the client device for rendering a transit map.

With continued reference to FIG. 2, the dynamic style controller 102 may manage and use a style table 110 that indicates various attributes for styles used in rendering maps at client devices. In general, the style table 110 may be implemented in any suitable manner, including the example illustrated in FIG. 2, according to which the style table 110 is indexed by the style identifier S and includes several component tables. In another embodiment, the style table 110 includes a single component table indexed by style identifier S.

According to an embodiment, the style table 110 includes a metadata table 120, which stores indexes to visual styles for various map types (base map, terrain map, etc.), an indication of a type of a map feature to which the style applies (road, building, etc.), and fields storing information specific to certain map features. The table 120 also may include fields that specify styles that apply to labels of a particular type or, alternatively, labels of all types, depending on the implementation. The metadata table 120 includes a priority field to associate style $S_4$, which applies to roads, with priority 2 (which may correspond to HIGHWAY), to consider just one example. Some of the entries in the metadata table 120 may include indexes $VS_1$, $VS_5$, etc. into a visual style table 122. The visual style table 122 may store visual characteristics for visual styles $VS_1, VS_2, \ldots VS_N$. For example, a record within the visual style table 122 may store color, thickness, fill color, stroke type, etc. In an embodiment, the visual style table 122 stores values that are used both by the map server that implements the map controller 100 and client devices to which the map server provides style data. For example, colors may be identified by integers. According to some scenarios, several entries in the metadata table 120 refer to the same visual style, such as visual style with an identifier $VS_5$, for example.

Figure 3:
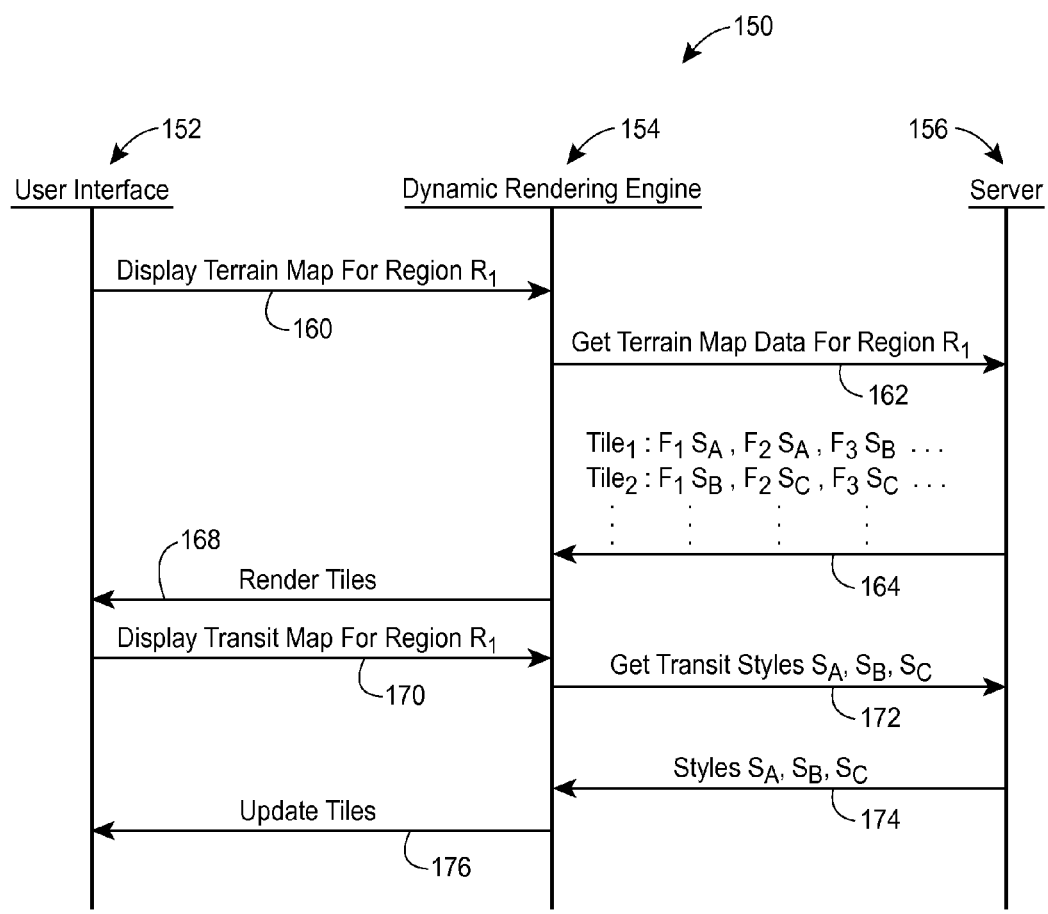
FIGS. 3-5 are interaction diagrams that illustrate example exchanges of information for rendering a map on a client device operating in the system of FIG. 1.
Figure 4:
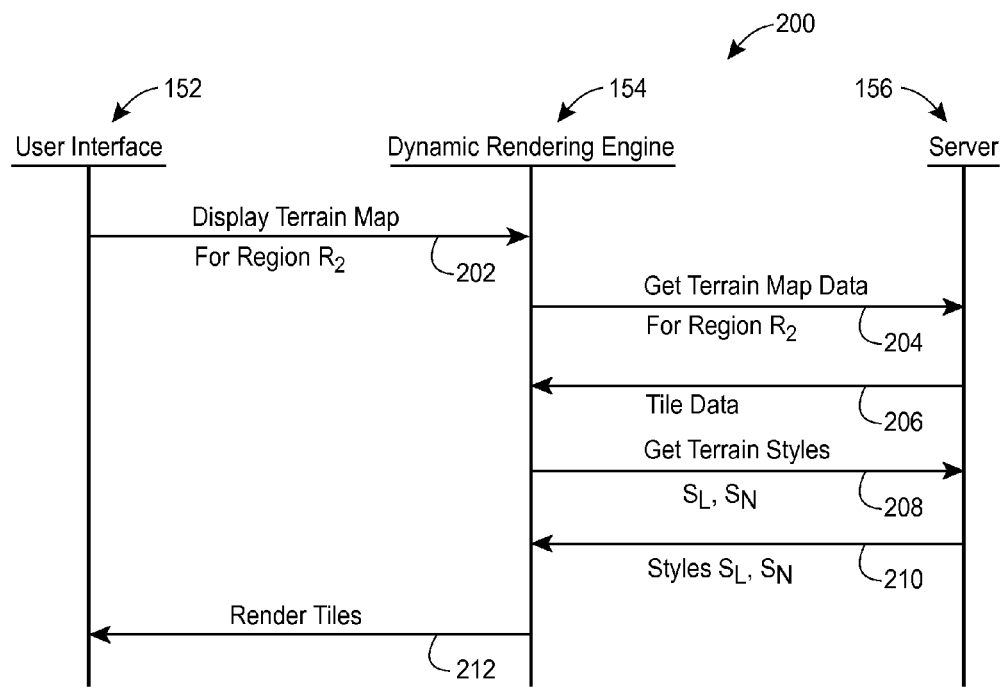
Figure 5:
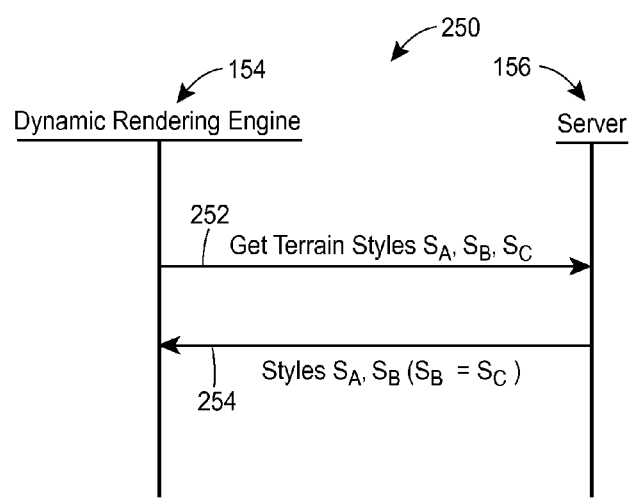
Figure 6A:
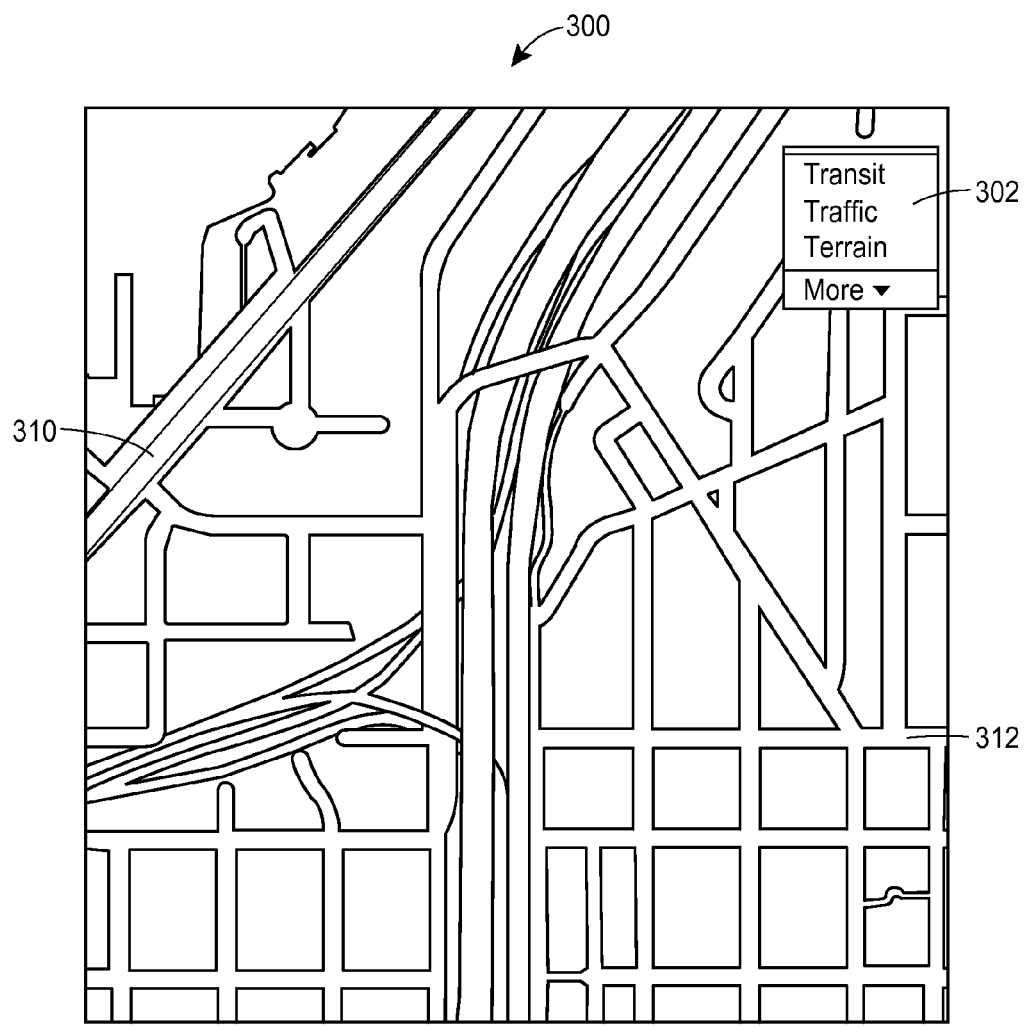
FIG. 6A is an example basic map that may be displayed at a client device operating in the system of FIG. 1.
Figure 6B:
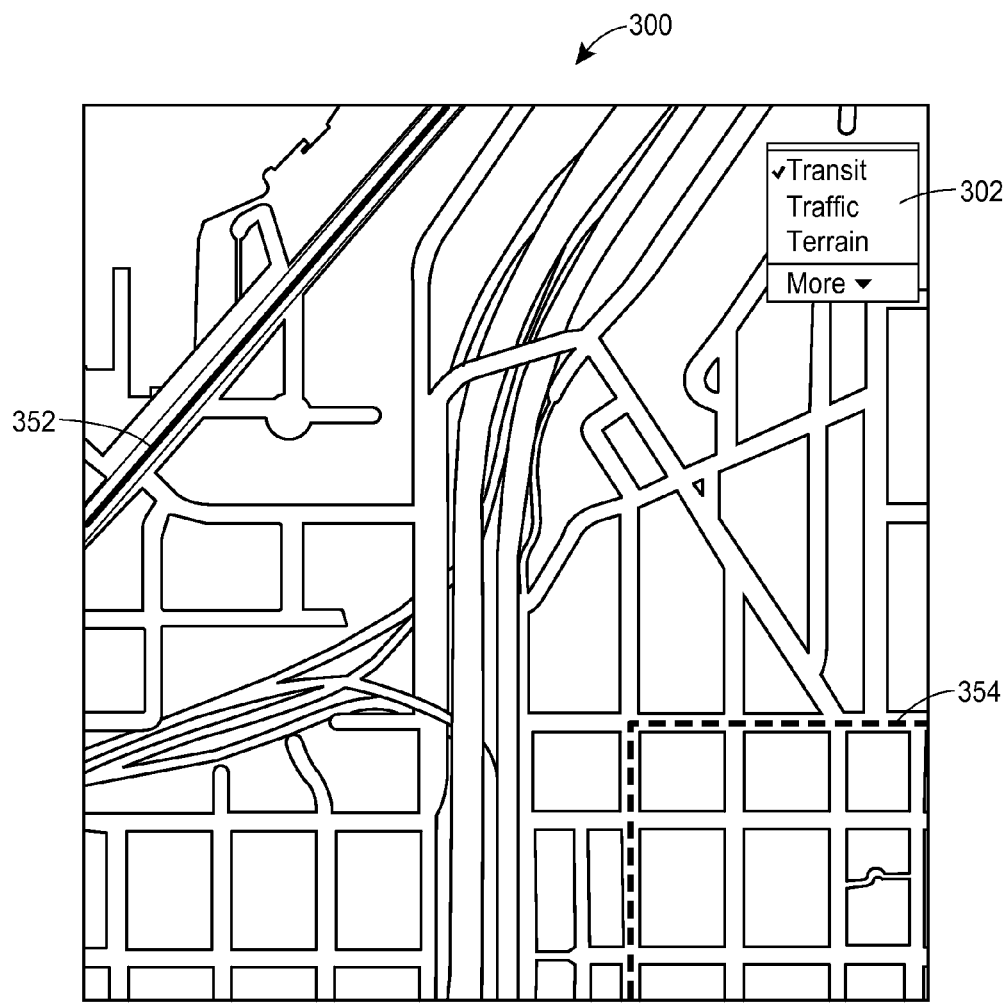
FIG. 6B is an example transit map that may be displayed after a user selects, via an interactive user interface, the transit map type at the client device displaying the basic map of FIG. 6A.

Next, to better illustrate operation of a map server and a client device in the system of FIG. 1 or a similar environment, several scenarios are considered with reference to the interaction diagrams illustrated in FIGS. 3-5, followed by a discussion of example map images in FIGS. 6A and 6B.

Referring first to FIG. 3, an example message exchange 150 involves a user interface 15, included in or otherwise associated with a client device (such as the client 14 of FIG. 1), a dynamic rendering engine 154 operating in the client device, and a server 156 (such as the map server 12 of FIG. 1). Referring back to FIG. 1, the user interface may be provided by the browser 60, while the dynamic rendering engine 154 and the server 156 may be implemented in the components 62 and 12, respectively.

In response to a user command, the user interface 152 may generate a request 160 for terrain map data for a certain region $R_1$ and provide the request to the dynamic rendering engine 154. The request 160 may be transmitted as an electronic message internal to the client device in which the components 152 and 154 are implemented, for example. The dynamic rendering engine 154 in turn may generate a request 162 for terrain map data, to be transmitted via a network communication to the server 156. The request 162 may specify the region $R_1$ using latitude and longitude (which may be obtained using a GPS device, for example) or in any other suitable manner. Further, the request 162 may include a map type indication to specify that map data is being requested for rendering a terrain map. Still further, in some embodiments, the request 162 indicates which styles are already available at the client device that implements the components 152 and 154. In another embodiment, the client device provides a style identifier as well as one or more map type indications for the corresponding style. For example, the client device may indicate that style data is already available for transit and traffic types corresponding to style $S_1$.

In response to the request 162, the server 156 may generate a response 164 that provides map data for rendering several tiles $T_1, T_2, \ldots T_N$. In general, however, map data may be provided for any number of tiles, including a single tile. For each tile, the response 164 may describe various features $F_1$, $F_2$, etc., each of which may be specified using one or several vector descriptors in accordance with a suitable vector graphics format. The response 164 also may include text data to specify labels that apply to features or groups of features. The response 164 may also indicate which styles apply to various features and/or labels. In the example of FIG. 3, the response 164 specifies that in tile $T_1$, features $F_1$ and $F_2$ are associated with style $S_A$, feature $F_3$ is associated with style $S_B$, etc. In some embodiments, the response 164 also includes a description of visual characteristics for styles $S_A$ and $S_B$ applicable to terrain maps. Upon receiving the response 164, the dynamic rendering engine 154 may generate map tiles in accordance with the received vector descriptors, text data, and style data (using an appropriate graphics library, for example), and generate an event 168 to cause the corresponding map image to be rendered via the user interface 152. To properly style various map features, the dynamic rendering engine 154 may utilize one or both of the style data included in the response 164 and the style data already available in the local style table (such as the style table 64 illustrated in FIG. 1).

In the scenario of FIG. 3, the user decides to change the map type from terrain to transit without changing the geographic coordinates and activates the appropriate control via the user interface 152. In response, the user interface 152 generates a request 170 for transit map data and forwards the request 170 to the dynamic rendering engine 154. Rather than requesting new map tile data, the dynamic rendering engine 154 may determine which styles, if any, are required for re-rendering the features described in the response 164 to display a transit map. For example, the dynamic rendering engine 154 may determine that style data related to transit maps is required for styles $S_A$, $S_B$, and $S_C$ and generate a request 172 for style data including the corresponding style identifiers.

In an embodiment, the server 156 provides the requested style data in a response 174 that includes, for example, a description of relevant visual characteristics such as line color, interior color, line thickness, etc. In an embodiment, the response 174 provides style data for a certain style in terms of visual styles for which the visual characteristics are already available at the client device. For example, the style data for style $S_A$ included in the response 174 may include an identifier of visual style $VS_i$ but not include a definition of the visual style $VS_i$ if the map server 156 determines that such data is already available at the client device. Also, the response 174 need not include any new vector descriptors or labels (however, in some scenarios, the response 174 may also include vector descriptors for features and/or labels that are displayed in a transit map of the region $R_1$ but are not displayed in a terrain map of the region $R_1$). Upon receiving the response 174, the dynamic rendering engine 154 may apply the received style data as appropriate to update the map tiles and generate an event 176 to cause the corresponding map image to be re-rendered via the user interface 152. Additionally, the dynamic rendering engine 154 may store the received style data in style table of the client device that implements the dynamic rendering engine 154.

In other embodiments, a request for style data, such as the request 172, does not include an explicit indication of which styles are required at the client device. In other words, the request for style data does not include style identifiers of the styles for which visual characteristics are required to re-render a map image according to a new map type. In one such embodiment, for example, the map controller 154 provides an indication of which styles are already available at the client device, and the server 156 uses this information to automatically identify style data to be provided in the response 174.

Referring to FIG. 4, rather than modifying a map type for the same region $R_1$, a user in another scenario 200 may wish to see a map of the same type (terrain) for another region, $R_2$, after a terrain map image is displayed at the client device for region $R_1$. The user interface 152 provides a request 202 for terrain map corresponding to region $R_2$ to the dynamic rendering engine 154, according to an embodiment. In response, the dynamic rendering engine 154 may generate a request 204 for new map features and/or labels to be displayed in the region $R_2$, and the server 156 may provide new tile data in a response 206. In an embodiment, the response 206 is similar to the response 164 discussed with reference to FIG. 3 and includes vector descriptors and text data along with the respective style identifiers. More specifically, the response 206 may specify the geometry and positioning of map elements according to a vector graphics format, labels according to a text format, and include style identifiers for some or all vector identifiers and labels. In some embodiments, the response 206 may omit a description of visual characteristics for these styles. In other embodiments, however, the response 206 may include a description of visual characteristics for some or all of the styles.

Upon receiving the response 206, the dynamic rendering engine 154 may determine for which of the styles referenced in the response 206 the dynamic rendering engine 154 does not yet store style data. For example, the dynamic rendering engine 154 may determine that the style table at the client device already stores style data for most of the styles referenced in the response 206 but does not yet have style data for styles $S_L$ and $S_N$. Accordingly, the dynamic rendering engine 154 may generate a request 208 for style data corresponding to a terrain map and styles $S_L$ and $S_N$. The server 156 may provide the requested style data in a response 210, and the dynamic rendering engine 154 may cause new map tiles to be rendered using the vector descriptors received in the response 206, the new style data received in the response 210, and the previously received style data (e.g., style data received during an exchange similar to the messages 162 and 164 illustrated in FIG. 3). The dynamic rendering engine 154 then may then generate an event 212 to cause the updated map image to be displayed via the interface 152. In this manner, the server 156 may efficiently provide map data to the dynamic rendering engine 154 without re-transmitting same style data for various geographic regions.

FIG. 5 illustrates another scenario 250 according to which the server 156 efficiently provides style data to the dynamic rendering engine 154. The dynamic rendering engine 154 may generate a request 252 for style data corresponding to styles $S_A$, $S_B$, and $S_C$. Similar to the example discussed with reference to FIG. 4, the request 252 may indicate a map type for which style data is being requested. For example, the request 252 may include a map type indication field with the value corresponding to the terrain type. Upon receiving the request 252, the server 156 may determine whether any of the styles $S_A$, $S_B$, and $S_C$ share visual styles when used to render a terrain map. In the example of FIG. 5, the server 156 may determine that styles $S_B$ and $S_C$ share visual styles, but style $S_A$ is distinct from styles $S_B$ and $S_C$. The server 156 may generate a response 256 that includes a definition of visual styles $S_A$ and $S_B$ (e.g., data related to color, line thickness, etc.) as well as an indication that styles $S_B$ and $S_C$ share visual styles for the requested map type, rather than an explicit definition of style $S_C$.

To further illustrate the techniques discussed above, FIGS. 6A and 6B depict maps that correspond to the same geographic region and are displayed according to the basic map type and the transit map type, respectively. A map server (such as the map server 12 of FIG. 1) may provide map content independently of style data to a client device (such as the client device 14 of FIG. 1) for rendering map images via a user interface of the client device. In particular, a map image 300 of a basic map, as illustrated in FIG. 6A, includes map elements such as roads of several types, with each road being rendered using the corresponding description in a vector format and the corresponding style data. For example, roads 310 and 312 may be described in a vector format using straight lines or Bezier curves, with the width, color, and visual characteristics of the roads 310 and 312 being specified by the corresponding styles. A user may select the map type using an interactive dialogue box 302.

After the user may changes the map type to "transit," the map image 300 is modified to reflect transit information, as illustrated in FIG. 6B. In this example, certain map features are rendered in the same manner for both the basic map type and the transit map type. The roads 310 and 312 of FIG. 6A, however, are re-rendered as roads 352 and 354, respectively. More specifically, the roads 310 and 352, as well the roads 312 and 354, are rendered using same vector descriptors but different styles. In an example scenario, the vector descriptors are obtained once for rendering the basic map illustrated in FIG. 6A, and style data for re-rendering the roads 310 and 312 as roads 352 and 354 is obtained separately after the user modifies the map type via the interactive dialogue box 302.

Next, several example methods that may be implemented in computing devices operating in the system of FIG. 1 or a similar environment are discussed with reference to FIGS. 7-9. These methods may be implemented as computer programs developed in any suitable programming language and stored on the tangible, non-transitory computer-readable medium (such as one or several hard disk drives) and executable on one or several processors. More specifically, the methods of FIGS. 7 and 8 may be implemented in the map server 12, and the method of FIG. 9 may be implemented in the client device 14. Although the methods of FIGS. 7-9 can be executed on individual computers, such as servers or personal computers (PCs), it is also possible to implement at least some of these methods in a distributed manner using several computers, e.g., in a cloud computing environment.

Figure 7:
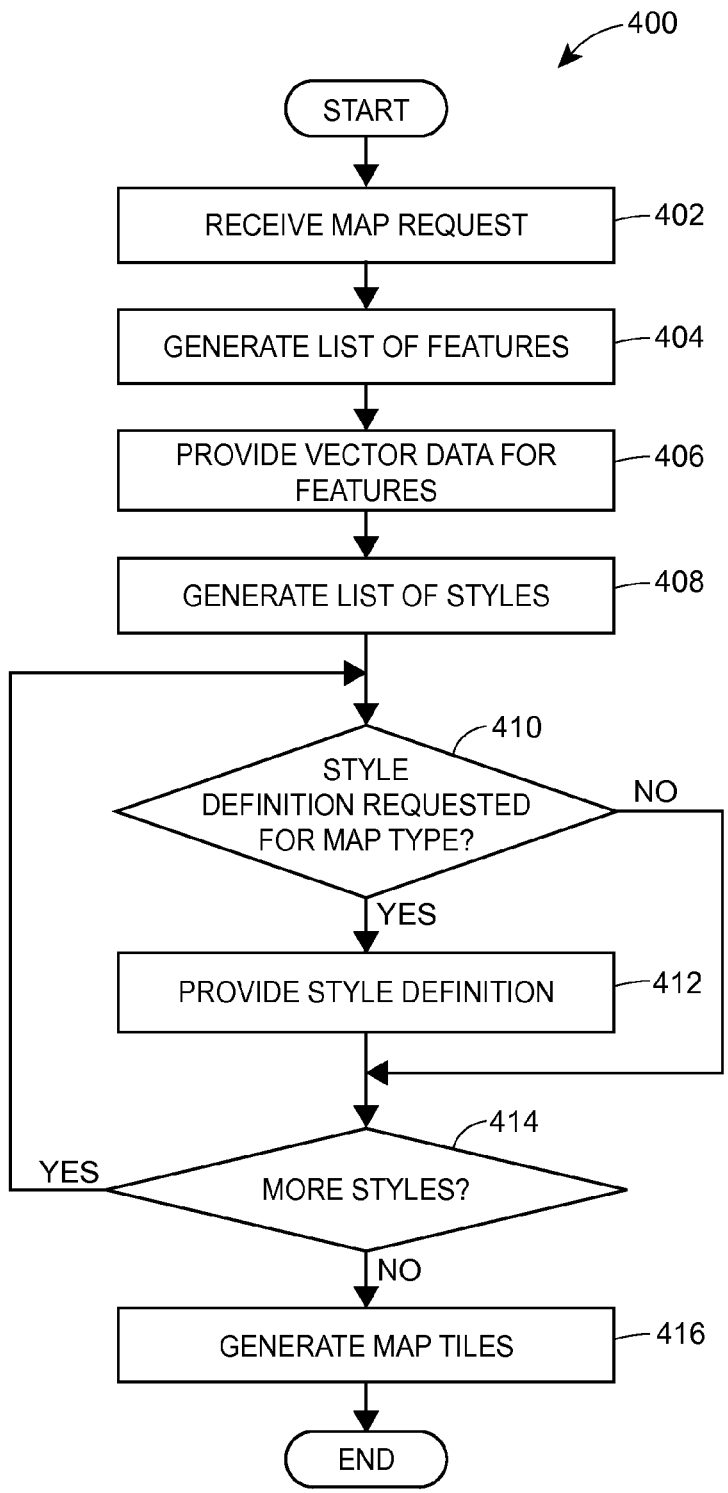
FIG. 7 is a flow diagram of an example method for processing a request for map data at a server that may operate in the system of FIG. 1.

Referring first to FIG. 7, an example method 400 for processing a request for map data may be implemented in a map server, for example. At block 402, a request for map data is received from a client device. The request for map data may specify some or all of a geographic region for which map data is being requested, a zoom level, a map type, an indication of style data already available at the client device, etc. In general, the request for map data may be an electronic message that conforms to any suitable format (e.g., HTTP layered over TCP/IP).

At block 404, the request is processed and a list of map features is generated in accordance with the requested map type, zoom level, and other parameters. For example, the list of map features for a basic map may include, at a certain zoom level, buildings, roads, parks, bodies of water, etc. For a transit map, the list may also include bus routes, subway lines, etc. Next, vector descriptors are provided for the generated list of features at block 406. Referring back to FIG. 2, for example, blocks 402, 404, and 406 may be implemented in the components 108, 106, and 104, respectively.

At block 408, a list of styles applicable to the requested map data is generated. In an embodiment, the list generated at block 408 includes each style identifier used with one or more vector descriptors generated at block 404. Next, at blocks 410-414, style data to be provided to the client device is selected. First, at block 410, it is determined whether the client device has requested the definition for a certain style included in the generated list. As discussed above, a request for map data or style data (such as the one received at block 402) may specify styles explicitly by including style identifiers for styles unavailable at the client device, for example, or implicitly by providing a list of styles already available at the client device. If it is determined that the client device has requested style data for the given style, a set of visual characteristics is provided at block 412, and the flow proceeds to block 414. Otherwise, if it is determined that the client device has not requested style data for the given style, the flow proceeds directly to block 414.

If the list of styles is not yet exhausted, the flow returns from block 414 to block 410. Otherwise, if it is determined at block 414 that all styles in the list generated at block 408 have been processed, the flow proceeds to block 416, where one or more map tiles are generated. In particular, the data provided at blocks 406 and 412 may be organized according to the corresponding map tiles and included in one or several electronic messages to be transmitted to a client device. Referring back to FIG. 3, for example, the data for each map tile may include vector descriptors for the map elements to be rendered in the map tile as well as style identifies for the styles to be applied to these vector descriptors.

Figure 8:
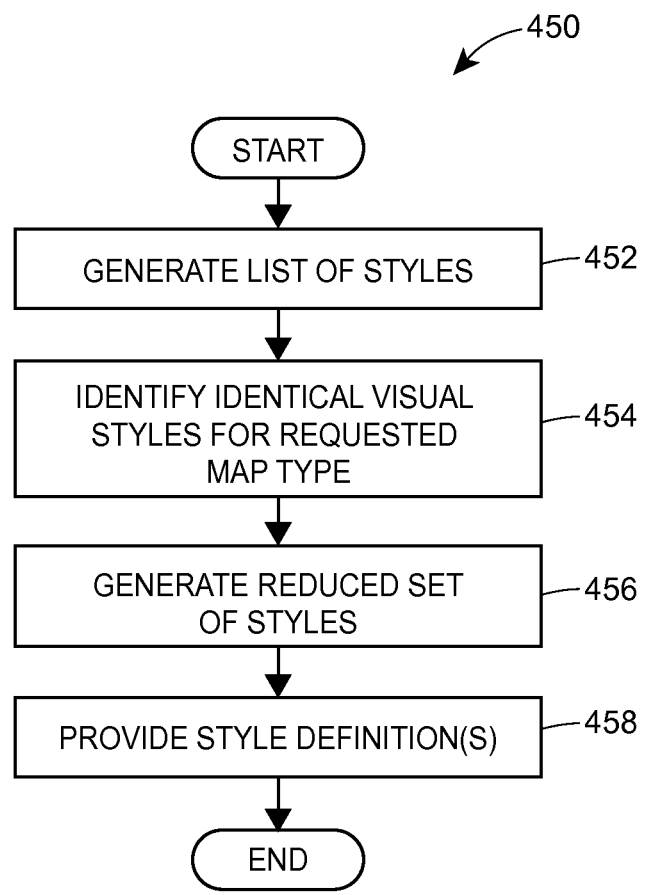
FIG. 8 is a flow diagram of an example method for generating style data at a server that may operate in the system of FIG. 1.

FIG. 8 is a flow diagram of an example method 450 for efficiently generating style data to be provided to a client device. Similar to the method 400 discussed above, the method 450 may be implemented as computer instructions executable in a map server such as the map server 12 of FIG. 1. At block 452, a list of styles required for rendering a map image at a client device is generated. The list of styles may be generated in response to a request for map data including both map content and style data, a request for style data alone, or a similar event. In an embodiment, the request indicate a map type for which style data is being requested. Next, at block 454, styles with identical visual characteristics for the specified map type are identified. For example, it may be determined for the specified map type, styles with style identifiers $S_5$ and $S_9$ correspond to the same visual style $VS_3$, although these styles need not share the visual style for other map types. Accordingly, a reduced set of styles may be generated at block 456, so that same visual characteristics are not provided to the client device in response to the same request. To continue with the example above, the reduced set of styles may include only style $S_5$, along with an indication that styles $S_5$ and $S_9$ share visual characteristics. The style definitions for the reduced set of styles then may be provided to the client device at block 458 via one or several electronic messages.

Figure 9:
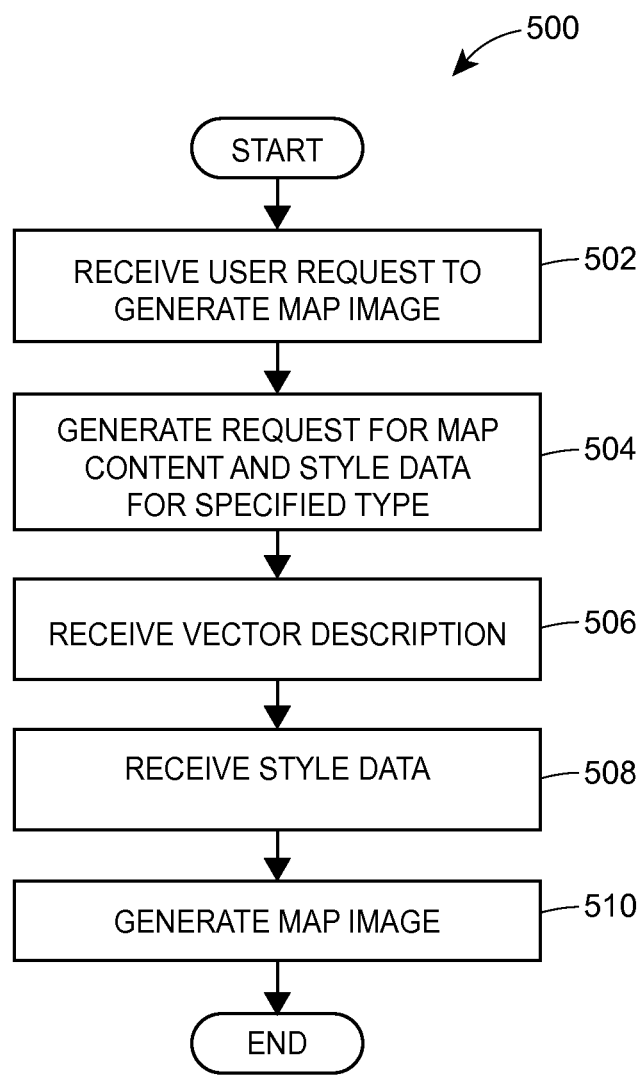
FIG. 9 is a flow diagram of an example method for retrieving map data from a server implemented in a client device that may operate in the system of FIG. 1.

Now referring to FIG. 9, an example method 500 for retrieving map data from a map server may be implemented in a client device such as the client device 14 of FIG. 1, for example. More specifically, the method 500 is implemented in a dynamic map rendering engine similar to the component 62 of FIG. 1 or the component 154 of FIGS. 3-5, according to an embodiment.

At block 502, a user request to generate a map image for a certain geographic region is received from a user interface, for example. The user request may be generated in response to the user activating an interactive control such as a button or, in some scenarios, simply loading a web page that includes an embedded map. In addition to an indication of a geographic area, the user request may specify a map type and indicate a zoom level. In an embodiment, the default map type may be set to a basic map.

A request for map content and style data for the specified map type may be generated at block 504. In some embodiments, the request for style data is generated in view of the style data already available at the client device. For example, the request generated at block 504 may include style identifiers for those styles that are stored in a style table of the client device for the specified map type. In another embodiment, the request for map content and style data does not explicitly identify the requested styles.

At block 506, the requested map content is received in the form of vector data, e.g., as vector descriptors corresponding to map features. The vector descriptors may be provided along with respective style identifiers to indicate, to the client device, how the map features should be rendered. Next, style data is received at block 508. In some embodiments, the map content and the style data are received in a single message. In other embodiments, the map content and the style data are received separately. At block 510, a map image is generated using the received map content and one or both of the style data received at block 508 and style data previously made available at the client device. Further, in an embodiment, an additional request for style data is generated as an additional step (not shown) following block 506 or 508, for example.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a map server for providing data to a client device for rendering map images at the client device, wherein the client device is coupled to the map server via a communication network, the method comprising:
   receiving, from the client device, a request for map data for generating a first map image at the client device, including receiving a selection of a geographic region and a first map type;
   in response to the request for map data, (i) generating a plurality of vector descriptors, wherein each vector descriptor indicates a geometry of a respective map element in accordance with a vector graphics format, (ii) generating, for each of the plurality of vector descriptors, a respective style identifier that identifies a style according to which the corresponding map element is rendered, (iii) causing map data that includes the plurality of vector descriptors and the style identifiers to be transmitted to the client device;
   providing a description of first visual characteristics of the identified styles for the first map type to the client device, wherein the client device applies the first visual characteristics to the plurality of vector descriptors to generate the first map image;
   subsequently to receiving the request for map data, receiving, from the client device, a request for style data for generating a second map image corresponding to the previously selected geographic region and a second map type; and
   in response to receiving the request for the style data, (i) generating a description of second visual characteristics for one or more of the identified styles for the second map type, and (ii) causing the description of second visual characteristics to be transmitted to the client device, wherein the client device applies the second visual characteristics to the plurality of vector descriptors at the client device to generate the second map image.

2. The method of claim 1, further comprising not causing the plurality of vector descriptors to be re-transmitted to the client device in response to receiving the request for the style data.

3. The method of claim 1, wherein each of generating the first description of visual characteristics and the second description of visual characteristics includes at least one of:
   generating an indication of line thickness;
   generating an indication of an interior color for filling an area inside a corresponding shape; and
   generating an indication of a line color for coloring lines defining the corresponding shape.

4. The method of claim 1, wherein:
   the first map type is one of terrain map, transit map, and traffic map; and
   the second map type is another one of terrain map, transit map, and traffic map.

5. The method of claim 1, wherein:
   each of the identified styles is associated with at least a first visual style corresponding to the first map type and a second visual style corresponding to the second map type;
   generating the first description of visual characteristics includes generating a description of visual characteristics associated with the first visual style;
   generating the second description of visual characteristics includes generating a description of visual characteristics associated with the second visual style.

6. The method of claim 1, wherein generating the plurality of vector descriptors includes generating a vector descriptor corresponding to one of a building, a road, and an area defined by a polygon.

7. The method of claim 1, wherein a first style identifier included in the map data identifies a first style, and a second style identifier included in the map data identifies a second style; wherein generating the second description of visual characteristics for the one or more styles includes:
   determining whether visual characteristics associated with the first style are identical to visual characteristics associated with the second style; and
   in response to determining that the visual characteristics associated with the first style are identical to the visual characteristics associated with the second style:
   generating a description of the visual characteristics for only the first style,
   generating an indication that the visual characteristics associated with the first style are identical to the visual characteristics associated with the second style, and
   providing the indication to the client device.

8. The method of claim 1, further comprising:
   generating a plurality of map labels, wherein each of the plurality of map labels includes one or several characters, wherein the map data further includes the plurality of map labels;
   generating a set of one or more style identifiers that identify one or more styles according to which the plurality of map labels is rendered; and
   causing the set of one or more style identifiers to be transmitted to the client device.

9. The method of claim 8, further comprising generating a description of visual characteristics of the one or more styles according to which the plurality of map labels is rendered, including one or more of:
   generating an indication of character font,
   generating an indication of character color, and
   generating an indication of character size.

10. The method of claim 1, wherein providing the first description of visual characteristics to the client device is in response to the request for map data.

11. The method of claim 1, wherein receiving the request for map data includes receiving a selection of a zoom level.

12. A tangible non-transitory computer-readable medium having instructions stored thereon that, when executed on a processor of a client device, cause the processor to:
- receive, from a user interface, a request to generate a first map image for a selected geographic region corresponding to a first selected map type;
- generate a request for map data corresponding to the selected geographic region and the first selected map type,
- cause the request for the map data to be transmitted to a map server via a communication network;
- receive, from the map server in response to the request for map data, (i) a plurality of vector descriptors that describe respective map elements associated with the selected geographic region, (ii) for each of the plurality of vector descriptors, a respective style identifier that identifies a style according to which the corresponding map element is rendered, and (iii) a description of first visual characteristics for the identified styles corresponding to the first selected map type; and
- generate the first map image using the received plurality of vector descriptors and the received description of first visual characteristics;
- receive, from the user interface, a request to generate a second map image for the previously selected geographic region corresponding to a second selected map type;
- generate a request for style data corresponding to the second selected map type and the identified styles;
- cause the request for style data to be transmitted to the map server via the communication network;
- receive, from the map server in response to the request for style data, a description of second visual characteristics for the identified styles corresponding to the second selected map type; and
- generate the second map image using the plurality of vector descriptors and the second description of visual characteristics.

13. The computer-readable medium of claim 12, wherein:
each of the identified styles is associated with at least a first set of visual characteristics corresponding to the first map type, and a second set of visual characteristics corresponding to the second map type.

14. The computer-readable medium of claim 13, wherein the first selected map type is one of terrain map, transit map, and traffic map, and the second selected map type is another one of terrain map, transit map, and traffic map.

15. The computer-readable medium of claim 12, wherein the instructions are in a scripting language interpreted at runtime by a browser application that executes on the client device.

16. The computer-readable medium of claim 12, wherein to generate the request for map data, the instructions further cause the processor to:
- identify styles for which style data associated with the first selected map type is not available in a memory of the client device, and
- wherein the received description of first visual characteristics corresponds to styles for which style data associated with the selected map type is not available in the memory of the client device.

17. The method of claim 12, wherein each of the description of first visual characteristics and the description of second visual characteristics includes, for each of one or more styles, one or more of:
- an indication of line thickness;
- an indication of an interior color for filling an area inside a corresponding shape; and
- an indication of a line color for coloring lines defining the corresponding shape.

18. The computer-readable medium of claim 12, wherein the request for map data further corresponds to a selected zoom level.

19. A method in a map server for providing data to a client device for rendering map images at the client device, wherein the client device is coupled to the map server via a communication network, the method comprising:
- providing a plurality of vector descriptors to the client device, wherein each of the plurality of vector descriptors describes a respective map element in accordance with a vector graphics format;
- providing, for each of the plurality of vector descriptors, a respective style identifier that identifies a style according to which the corresponding map element is rendered, wherein:
  - each style is associated with several sets of visual characteristics, each set corresponding to a different map type, wherein the map type is selected at the client device, and
  - each of the plurality of vector descriptors is rendered at the client device using a corresponding set of visual characteristics selected based on the identified style ad the map type selected by the user;
- receiving, from the client device, a request for style data, including receiving a plurality of style identifiers and a selection of map type;
- determining which of the styles identified by the style identifiers included in the request for style data share visual characteristics for the selected map type; and
- providing the style data to the client device, including:
  - providing a single instance of a description of visual characteristics shared by two or more styles, and
  - providing an indication that the two or more styles share the visual characteristics.

20. The method of claim 19, wherein providing the single instance of the description of visual characteristics includes at least one of:
- providing an indication of line thickness;
- providing an indication of an interior color for filling an area inside a corresponding shape; and
- providing an indication of a line color for coloring lines defining the corresponding shape.

21. The method of claim 19, wherein the map type is one of terrain map, transit map, and traffic map.

* * * * *